US010664980B2

(12) United States Patent
Zaharia et al.

(10) Patent No.: US 10,664,980 B2
(45) Date of Patent: May 26, 2020

(54) VECTOR GRAPHICS HANDLING PROCESSES FOR USER APPLICATIONS

(71) Applicant: Microsoft Technology Licensing, LLC, Redmond, WA (US)

(72) Inventors: Ancuta Irina Zaharia, Sammamish, WA (US); Matthew James Wagner, Renton, WA (US); Haitao He, Redmond, WA (US); Jie Li, Bellevue, WA (US); Stephanie Lorraine Horn, Bellevue, WA (US); Constance Worsfold Gervais, Seattle, WA (US); Bitan Deb, Redmond, WA (US); Bharat Kumar Ahuja, Bellevue, WA (US); Zhiying Guo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 15/617,637

(22) Filed: Jun. 8, 2017

(65) Prior Publication Data

US 2018/0357776 A1 Dec. 13, 2018

(51) Int. Cl.
*G06T 7/50* (2017.01)
*G06T 11/20* (2006.01)
*G06F 40/151* (2020.01)
*G06T 3/40* (2006.01)
*G06F 40/14* (2020.01)

(52) U.S. Cl.
CPC .............. *G06T 7/50* (2017.01); *G06F 40/14* (2020.01); *G06F 40/151* (2020.01); *G06T 3/40* (2013.01); *G06T 11/203* (2013.01); *G06T 2200/24* (2013.01)

(58) Field of Classification Search
CPC ..... G06T 3/40; G06T 11/203; G06T 2200/24; G06F 40/14; G06F 40/151
See application file for complete search history.

(56) References Cited

U.S. PATENT DOCUMENTS 6,992,782 B1 * 1/2006 Yardumian ........... G06F 3/1206
358/1.13
7,525,544 B2 4/2009 Whatmough
(Continued)

FOREIGN PATENT DOCUMENTS

CN 103793365 A 5/2014

OTHER PUBLICATIONS

"Vector graphics—Wikipedia", Retrieved from: https://en.wikipedia.org/wiki/Vector_graphics, Retrieved Date: Apr. 20, 2017, 7 Pages.
(Continued)

*Primary Examiner* — Chante E Harrison (57) ABSTRACT

Systems, methods, apparatuses, and software for vector graphics object handling in computing environments are provided herein. In one example, an object handling service for a user application is provided that identifies an object in a scalable vector graphics format for import into the user application, parses a description of the object in the scalable vector graphics format to determine shape components that comprise the object, and iterates through each of the shape components to generate freeform shape primitives that recreates the object into a native object description of the user application.

20 Claims, 4 Drawing Sheets

(56) References Cited

U.S. PATENT DOCUMENTS

| | | | | |
|---|---|---|---|---|
| 9,430,195 | B1* | 8/2016 | Pecoraro | G06T 11/203 |
| 9,965,446 | B1* | 5/2018 | Joshi | G06T 11/00 |
| 2003/0098862 | A1* | 5/2003 | Hunt | G06T 17/00 |
| | | | | 345/418 |
| 2004/0194020 | A1 | 9/2004 | Beda et al. | |
| 2004/0208370 | A1* | 10/2004 | Whatmough | G06T 9/00 |
| | | | | 382/173 |
| 2005/0104894 | A1* | 5/2005 | Sanborn | G06T 11/203 |
| | | | | 345/592 |
| 2008/0158581 | A1* | 7/2008 | Ferlitsch | G06F 3/1206 |
| | | | | 358/1.13 |
| 2010/0021059 | A1* | 1/2010 | Ito | G06K 9/342 |
| | | | | 382/173 |
| 2010/0283780 | A1* | 11/2010 | Ohmori | G06T 15/20 |
| | | | | 345/419 |
| 2015/0082148 | A1* | 3/2015 | Lai | G06F 17/214 |
| | | | | 715/235 |
| 2015/0205398 | A1* | 7/2015 | Le | G06F 36/04883 |
| | | | | 345/173 |
| 2016/0098250 | A1* | 4/2016 | Gross | G06F 8/20 |
| | | | | 717/109 |
| 2017/0054831 | A1* | 2/2017 | Smith | H04L 67/34 |
| 2017/0220277 | A1* | 8/2017 | Nakayama | G06F 13/00 |
| 2017/0287099 | A1* | 10/2017 | Self | G06T 15/00 |
| 2017/0293592 | A1* | 10/2017 | He | G06F 17/211 |
| 2017/0315696 | A1* | 11/2017 | Jacobson | F24F 11/30 |
| 2018/0204477 | A1* | 7/2018 | Fyfe | G09B 7/02 |

OTHER PUBLICATIONS

Abu-Taieh, et al., "Taxonomy of Image File Formats", In Proceedings of the Fourth International Conference on E-Learning Best Practices in Management, Design and Development of E-Courses: Standards of Excellence and Creativity, May 7, 2013, pp. 74-81.

Di Iorio, et al., "Dynamic Conversion Between Xml-Based Languages for Vector Graphics", In Proceedings of the Visual communications and image processing, vol. 6061, Jan. 18, 2006, 9 Pages.

Kapetanakis, et al., "A novel approach in converting SVG architectural data to X3D worlds", In Proceedings of the International Conference on Telecommunications and Multimedia, Jul. 1, 2010, 13 Pages.

"International Search Report and Written Opinion Issued in PCT Application No. PCT/US2018/031925", dated Jul. 23, 2018, 13 Pages.

Zygmunt, et al., "Circular arc approximation using polygons", In Journal of Computational and Applied Mathematics, vol. 322, Mar. 31, 2017, pp. 81-85.

"SVG graphics coming to Office . . . at long last!", https://office-watch.com/2016/svg-graphics-coming-to-office-at-long-last/, Published on: Nov. 14, 2016, 8 pages.

Ackmann, Heather, "Convert an Illustrator Vector Graphic to a PowerPoint Shape", http://heatherackmann.com/convert-an-illustrator-vector-graphic-to-a-powerpoint-shape, Published on: Oct. 13, 2015, 8 pages.

"XInkPlus graphics & images editor in remote", https://itunes.apple.com/us/app/xinkplus-graphics-images-editor-in-remote/id1076862403?mt=8, Retrieved on: Mar. 29, 2017, 5 pages.

"Insert SVG images in Microsoft Office", https://support.office.com/en-gb/article/Insert-SVG-images-in-Microsoft-office-69f29d39-194a-4072-8c35-dbe5e7ea528c,Retrieved on: Mar. 29, 2017, 7 pages.

"Insert SVG directly into Microsoft Publisher without converting file format", https://superuser.com/questions/298263/insert-svg-directly-into-microsoft-publisher-without-converting-file-format, Published on: Nov. 6, 2011, 3 pages.

Hitola, Bethany, "Inkscape beginner", In Publication of Packt Publishing Ltd., May, 2012, 299 pages.

Irelan, Ryan, "Important SVG Elements", https://mijingo.com/blog/important-svg-elements, Published on: Mar. 22, 2015, 8 pages.

\* cited by examiner

VECTOR GRAPHICS HANDLING PROCESSES FOR USER APPLICATIONS

TECHNICAL BACKGROUND

User applications can include various editing functions and features that allow users to create and edit various content. This content can include text content, graphical content, or other content such as multimedia content. Various file formats and object representations are established that allow a user to save files, import files and objects, or other functions. For example, a user might receive a file saved in a first format and wish to edit the file in another format. These files might include graphical content, such as images and objects described in various standardized file formats including Graphics Interchange Format (GIF), Joint Photographic Expert Group formats (e.g. JPG), or other formats. Among these formats, scalable or vector formats have been established, such as the scalable vector graphics (SVG) formats and portable document formats (PDF) that can describe text or graphical objects procedurally to enable easy scaling and manipulation without loss of integrity of the objects. However, these scalable formats can be limited in editing functionality as well as are beholden to external standardization organizations that may or may not desire to incorporate various features for user applications.

Overview

Systems, methods, apparatuses, and software for vector graphics object handling in computing environments are provided herein. In one example, an object handling service for a user application is provided that identifies an object in a scalable vector graphics format for import into the user application, parses a description of the object in the scalable vector graphics format to determine shape components that comprise the object, and iterates through each of the shape components to generate freeform shape primitives that recreates the object into a native object description of the user application.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

User applications can include various editing functions and features that allow users to create and edit various content. Various file formats and object representations are established that allow a user to save files, import files and objects, or other functions. For example, a user might receive a file saved in a first format and wish to edit the file in another format. Among these formats, scalable or vector formats have been established, such as the scalable vector graphics (SVG) format that can describe text or graphical objects procedurally so as to enable easy scaling and manipulation without loss of integrity of the objects. However, these scalable formats can be limited in editing functionality, and can also be difficult to edit in user applications that employ different object description processes. Advantageously, the examples herein can import files, shapes, or objects in an SVG format or other vector graphics format and apply these files, shapes, or objects within a native environment of a user application. Technical effects include enhanced editing features that users can apply to files, shapes, or objects, as well as reduced computing or processing loads on user systems that edit or otherwise use files, shapes, or objects due to the native formats negating the need to edit within a cumbersome external format.

Figure 1:
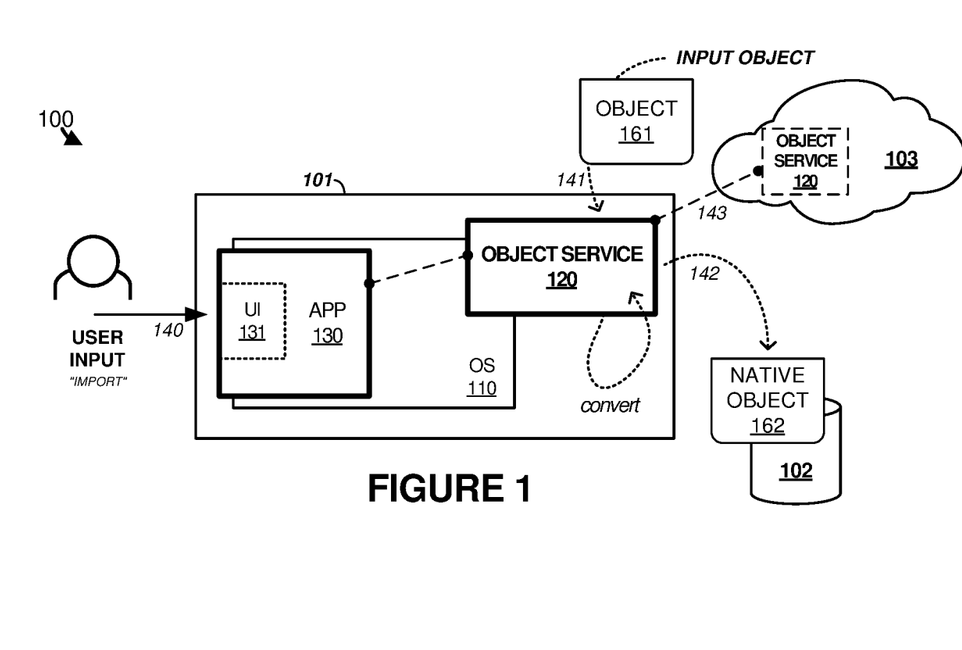
FIG. 1 illustrates a computing environment in an implementation.

In a first example of enhanced handling of vector graphics in user applications, FIG. 1 is presented. FIG. 1 illustrates implementation 100 suitable for implementing any of the architectures, processes, and operational scenarios disclosed herein. Specifically, implementation 100 includes computing platform 101 comprising operating system (OS) 110, object service 120, application 130, and user interface (UI) 131. Also optionally included in FIG. 1 are distributed computing system 103 and distributed storage system 102. Each of the elements of implementation 100 can be logically or communicatively coupled and executed on an associated computing system or processing system which can include elements as discussed below for FIG. 5, although variations are possible. Representative links 140-143 can be employed to communicatively couple the associated elements of implementation 100.

In operation, user input is received over user interface 131 through input method 140, such as user interface devices, graphical user interfaces, or other elements. This user input can be related to application usage by the user, such as user content editing applications. For example, in a word processing or presentation editor application environment, a user might interact with the application over a graphical user interface to create content, arrange or edit content, and then save or otherwise export content for use in other applications. Among this content, graphical or text elements might be employed, among other content. The graphical content might include vector graphics that comprised procedurally-defined vector graphics elements that can be scaled in size while maintaining graphical properties of the associated images, graphical objects, or other elements. In some examples, both graphical and text portions are included in the graphical content, such as when text labels are employed on graphical objects.

To include the graphical content, a user might create the content using drawing tools of the application, copy and paste the content from other user files or template/stencil files that include graphical content, or import the content from one or more files external to the current file being edited by a user, among other operations. At times, this graphical content is introduced to the user application in a format that is not compatible for native editing in the user application or may lack a feature set or feature robustness of that included in the user application. Thus, a user might desire to 'import' the graphical content into a format suitable for the user application. This format can be referred herein as a 'native' format used by the user application for content creation, manipulation, inclusion into a file type of the user application, and ultimately storage in the file containing the user content.

Figure 2:
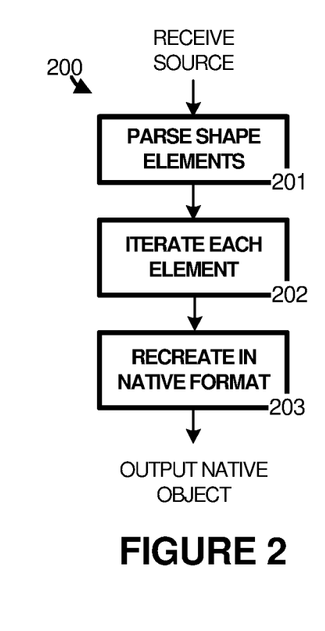
FIG. 2 illustrates an object handling process in an implementation.

FIG. 2 further details example operation 200 of the elements of implementation 100. In FIG. 2, application 130 presents a user interface for content editing to a user, such as through user interface 131. User interface 131 can present a user 'canvas' through which the user can interact with features of application 130. User input is received over link 140 for use by application 130. During content editing, a user might desire to include vector graphics elements that presently reside in a first file format or vector graphics format different than that of application 130. To provide enhanced editing features and a better user experience, among other advantages, application 130 might import the vector graphics elements into a native format used by application 130, where this native format comprises a format employed during editing by application 130.

To utilize the vector graphics elements within the native format employed in the user canvas of application 130, application 130 first identifies a file or graphical object that the user desires to import into application 130. This file or graphical object comprises a source drawing which can include one or graphical elements, shapes, text features, or other content in a vector graphics format. As mentioned herein, a first vector graphics format might include a scalable vector graphics (SVG) format among others. In FIG. 1, example input object 161 is shown as a source for this graphical content in a first vector graphics format. Example output object 162 is shown that includes graphical content in second vector graphics format, such as a native description or format of application 130. Object 161 can be received over link 141, which might comprise a logical link, storage link, memory link, or network link, among others.

Application 130 provides object 161 to object service 120 for processing into a native format or description for use by editing functions of application 130. Object service 120 parses (201) a description of the object in the scalable vector graphics format to determine shape components that comprise the object. Object service 120 iterates (202) through each of the shape components to generate freeform shape primitives that recreates (203) the object into a native object description of the user application. Object service 120 can then output object 161 in the native format for use by application 130 or for storage by storage platform 102.

Returning to the elements of FIG. 1, operating system 110 comprises one or more execution elements which provide an execution platform between user-facing applications and input devices and associated execution hardware. In many examples, operating system 110 comprises a multitasking or multithreaded operating environment for user applications, such as application 130 and object service 120, among other applications or services, and also provides logical access to user interface 131 and various hardware elements, such as displays, user input devices, multimedia devices, and the like. Operating system 110 allows execution of application 130 and object service 120 on associated processing systems and memory devices.

User interface (UI) 131 comprises one or more graphical or textual user interface elements which are presented to a user of implementation 100 for interacting with the elements of application 130 and object service 120, among other applications and services. UI 131 can comprise many graphical layers or graphical elements which are superimposed and correlated to render an interactive windowed or tablet interface to a user, such as over one or more display screens. UI 131 can also include various audio output elements for indicating audible user interface elements to a user. UI 131 receives user input from various input devices, such as a keyboard, mouse, touch screen, touch panel, gaming controller, or other user input devices which can be used in combination with such as mouse input, keyboard input, voice input, visual input, or other user input methods. This user input can be detected by UI 131 and translated into actions which can be interpreted by further elements of implementation 100, such as operating system 110, application 130, or object service 120.

Application 130 comprises one or more user applications, such as content editing applications, productivity applications, gaming applications, or communication applications, which is executed using OS 110 on a processing system. Application 130 presents one or more user interface elements, such as those rendered using UI 131, to allow a user to interact with application 130 and object service 120. For example, in application 130, user content can be created, edited, and saved. Application 130 provides for editing and viewing of user content contained in data files, such as documents, spreadsheets, images, media files, or other files. For example, when a file comprises a slide presentation, an editor of application 130 allows for viewing and editing of an organized deck of presentation slides which are surfaced to a user in a graphical arrangement, along with any associated menus, tabs, status indicators, and user input elements.

Object service 120 can comprise various data processing services for converting vector graphics in a first format into vector graphics in another format. Object service 120 can be provided on a local computing platform 101, or can be provided via distributed computing service 102, including combinations thereof. In some examples, a portion of object service 120 provided by computing platform 101 comprises an application programming interface (API) that communicates with a portion of object service 120 provided by distributed computing platform 103. For example, application 130 might be configured to communicate through an API to a cloud computing service provided by distributed computing platform 103.

Storage service 102 comprises one or more computer-readable storage media configured to store user data, such as user data files, vector graphics objects, or other data. In some examples, storage service 102 is provided as local storage elements in computing platform 101. In other example, storage service 102 is provided as distributed storage elements that are remotely located from computing platform 101. In yet further examples, storage service 102 is provided by a distributed computing platform, such as that discussed for platform 103.

Figure 3:
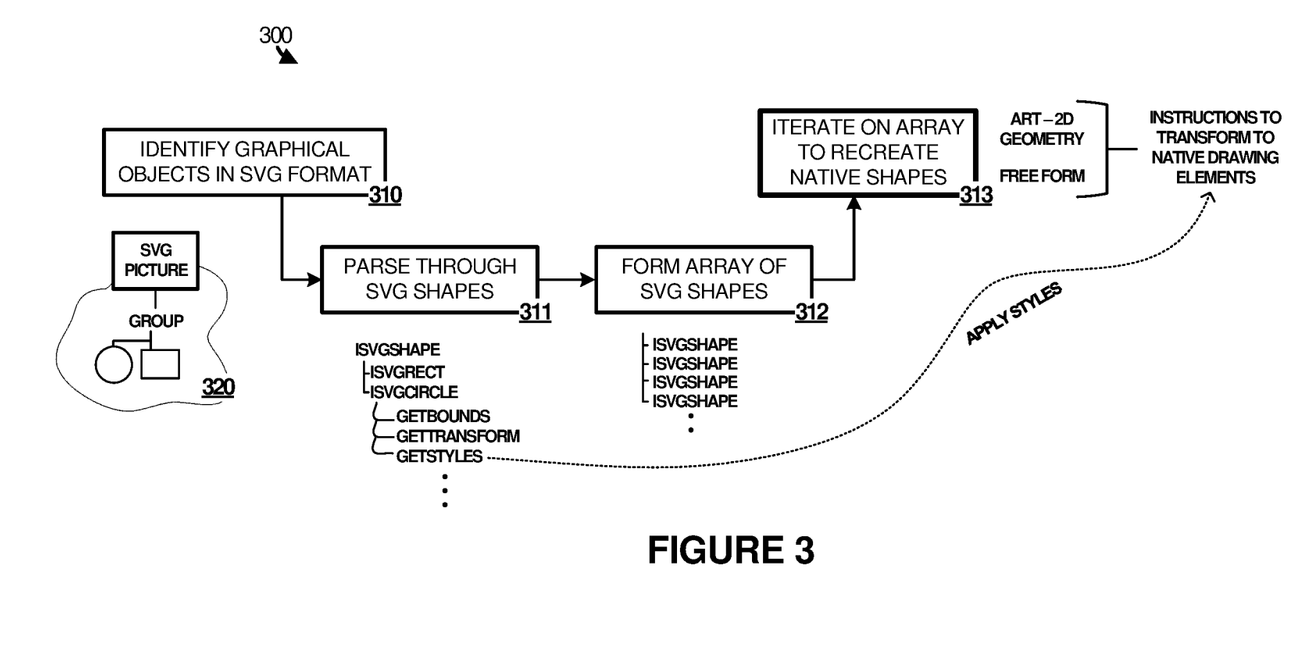
FIG. 3 illustrates an object handling process in an implementation.

As a further example operation 300 of a vector graphics handling system, FIG. 3 is presented. The operations of FIG. 3 can be applied to elements of FIG. 1 or to elements of FIG. 5 below, among other elements. For this example, elements of FIG. 1 will be discussed. In FIG. 3, application 130 identifies (310) graphical objects in an SVG format, such as SVG picture 320. SVG picture 320 can include one or more shapes, objects, text labels, or other elements. For simplicity, these elements can be referred to as 'shapes' in the discussion of FIG. 3.

Once SVG picture 320 is identified for processing, such as when a user indicates a file or other data object comprising SVG picture 320 through user interface 131, then application 130 can initiate a conversion process using object service 120. This conversion process is described in operations 311-313. In operation 311, object service 120 parses through shapes contained within SVG picture 320. SVG picture 320 can be defined by a procedural or textual description that provides instructions on the composition of shapes, properties, styles, locations, and other information related to shapes and shape relationships. In this example, each shape has an associated "ISVGSHAPE" data structure which might include sub-shapes if multiple shapes are in a grouping together. For example, a group might include a circle and a rectangle, along with other graphical and text content. Object service 120 steps through each 'top level' shape definition of SVG picture 320 to determine descriptive components of those shapes, such as arbitrary polygons, circles, ellipses, squares, rectangles, lines, splines, or other shapes and graphical objects. Each of these shapes can have one or more properties associated therewith, such as "GETBOUNDS," "GETTRANSFORM," and "GETSTYLES" indicated in FIG. 3, among others.

Once all of the shapes of SVG picture 320 have been identified by stepping or parsing through the shape descriptions in SVG picture 320, an array is formed (312) that includes all of the shapes found. This array can comprise any suitable data structure, and includes a listing of the shapes that comprise SVG picture 320, along with any relevant properties or descriptions that correspond to each shape. Typically, the array comprises entries indicating a procedural description of each of the shape components and one or more graphical properties that affect associated ones of the shape components.

Object service 120 then iterates (313) on each shape and re-creates the shapes in a native description of application 130 using at least "freeform" shape primitives. The freeform shape primitives can comprise non-predetermined polygon representations, such as line segments, splines, arcs, and Bézier curves, among other non-polygonal or circular shape primitives. In further examples, this iteration can include identifying compatible shape types from among the shape types supported in the native description, such as matching up a polygon, circle, or ellipse shape in SVG picture 320 to an ellipse shape in the native description.

In FIG. 3, shape types available in the native description might differ than those available in the SVG format. For example, 2-dimensional (2D) geometry might be used in the native description and this 2D geometry might include a variety of shapes different than that used by the SVG format. When a shape is used in the SVG format that is not supported in the native description, then a freeform or line drawing process can occur. This freeform line drawing process re-creates the associated shapes into the native description using one or more component lines, arcs, or splines. For example, if a 'squircle' was not supported in the native description (i.e. a square with rounded corners), then the squircle found in the SVG description can be generated in the native description using segments of lines and arcs to form an equivalent shape. Other shapes, such as arbitrary shapes and freeform shapes from the SVG description can also be generated in the native description using line segments, splines, arcs, or Bézier curves to form an equivalent shape.

Once the shapes have been generated by re-creating them in the native description, then various properties can be applied to the shapes. These properties can include 'styles' that comprise shape sizes, shape line widths or weights, shape fill properties, and other information. Moreover, relative positioning of the shapes among each other can be established as well. Thus, a complete description of SVG picture 320 in the native description format is achieved by iteratively re-creating the shapes of SVG picture 320 using the native descriptions and applying various properties to the re-created shapes.

Figure 4:
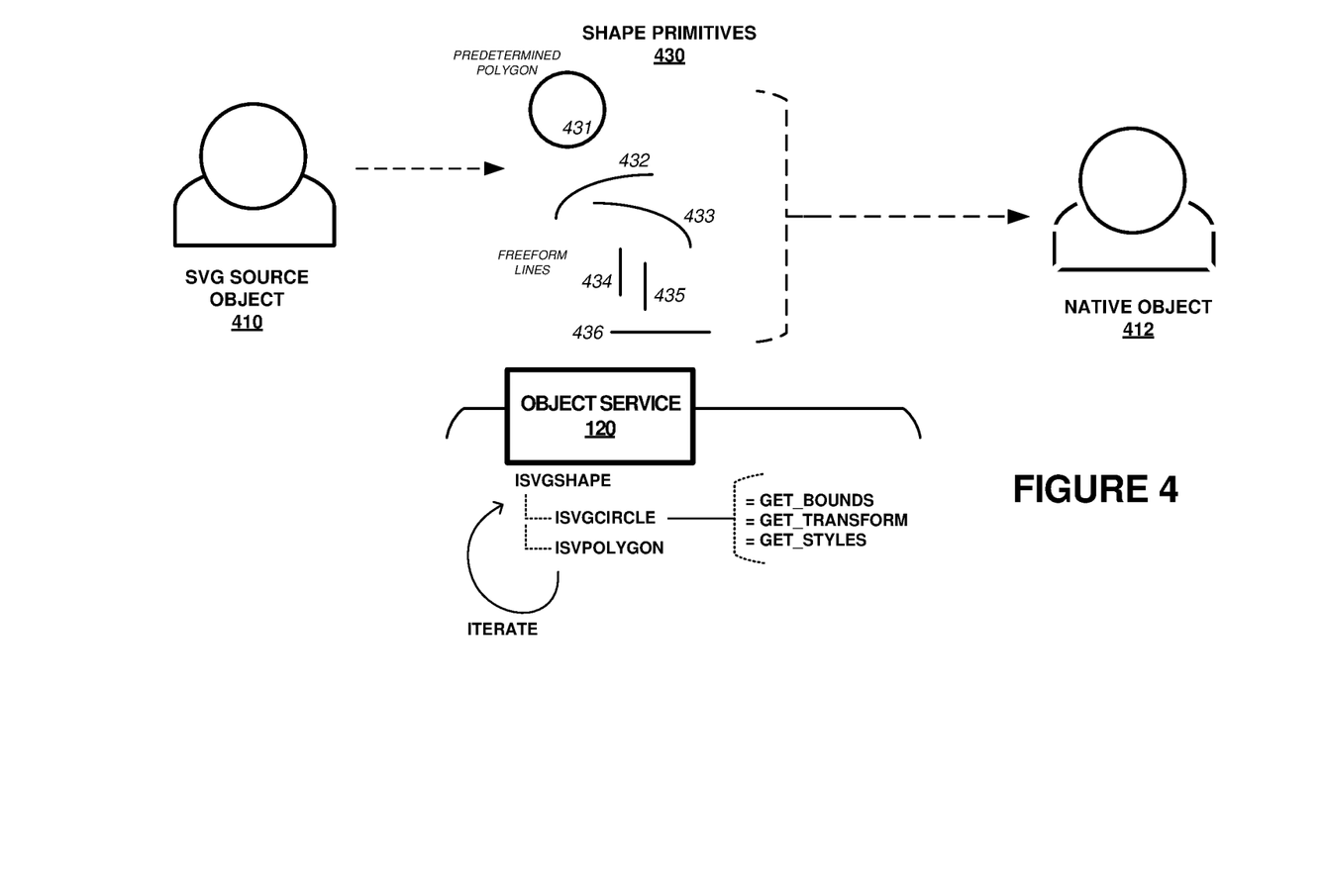
FIG. 4 illustrates an object handling process in an implementation.

As a further example operation of a vector graphics handling system, FIG. 4 is presented. The operations of FIG. 4 can be applied to elements of FIG. 1 or to elements of FIG. 5 below, among other elements. For this example, elements of FIG. 1 will be discussed. In FIG. 4, application 130 identifies graphical source objects in an SVG format, such as SVG source object 410. SVG source object 410 can include one or more shapes, graphical objects, text labels, or other elements. For simplicity, these elements can be referred to as 'shapes' in the discussion of FIG. 4.

Object service 120 can then determine component shapes of SVG source object 410, and re-generate or re-create SVG source object 410 in a different description language or format than used by SVG source object 410. For example, SVG source object 410 might be in an SVG extensible markup language (XML) document object model (DOM) format or equivalent description. The native description of the application comprises a description format or language that is employed by the application when editing or manipulating the components shapes of the drawing object.

For example, if application 130 comprises one of the Microsoft Office® applications (i.e. Word, PowerPoint, Excel, among others), then the native format or description can comprise the Microsoft Office® Shape Object format which is used to include and manipulate objects in Microsoft Office® documents or files. This Shape Object format can include drawing objects defined under the Office Drawing Extensions to Office Open XML Structure that employ "DrawingML" descriptions and formats. For example, documents that are described using SpreadsheetML, PresentationML, and WordprocessingML features in the Microsoft Office® environment can each include DrawingML objects. Thus, spreadsheet documents, presentation documents, and word processing documents can all include DrawingML objects. These DrawingML objects comprise XML-described objects that can comprise shape descriptions, grouping descriptions, as well as other descriptions in an XML marked-up format.

As a particular example, object service 120 can re-create SVG source object 410 into native object 412 in FIG. 4. First, object service determines shape components of SVG source object 410 by parsing through a description of SVG source object 410 in the SVG format. This format might include a procedural description of each of the shape components of SVG source object 410 that comprise extensible markup language (XML) representations of one or more shape components. In FIG. 4, these shape components can be determined by parsing through a description comprising SVG source object 410 to identify "ISVGSHAPE" components which might include various sub-shapes and corresponding properties or styles. Each of these "ISVGSHAPE" components are iterated among to generate shape primitives that re-create each of the "ISVGSHAPE" components.

In FIG. 4, shape primitives 430 include shape primitives 431-436. As can be seen, various freeform straight line segments 434-436 are determined that recreate a first portion of object 410, various arcs, splines, or Bézier curves are determined that recreate a second portion of object 410. Object service 120 can determine that one or more of the shape components of SVG source object 410 can be represented by one or more predetermined polygon shape primitives in the native object description, and responsively recreate the ones of the shape components using the one or more predetermined polygon shape primitives in the native object description. Thus, a predetermined polygon/circle 431 can be determined to recreate a third portion of object 410. However, instead of the predetermined polygon shape components, freeform lines can be employed to recreate a third portion of object 410. Each of the shape primitives are employed to recreate object 410 in the native object description.

Object service 120 can then, based on parsing of descriptions SVG source object 410, determine graphical properties to be applied to the shape primitives that comprise the object in the native format. After recreating SVG source object 410 into the native object description, object service 120 then can apply the graphical properties to the shape primitives in the native object description. Specifically, after generating the shape primitives, object service 120 determines which of the one or more graphical properties gleaned from the description parsed for SVG source object 410 that affect the shape primitives, and apply the one or more graphical properties to the shape primitives in the native object description. The graphical properties can include line weight properties, font or typeset properties, shape fill properties, spatial arrangements, layering arrangements, and grouping arrangements among the shape primitives.

Once shapes of SVG source object 410 have been converted into the native format, these shapes can be edited or otherwise altered in application 130 by a user. User operations performed on the shapes in the native format can include using 'ungroup' functions to separate elements into component pieces, as well as changing colors, sizes, shape vertices, skewing among shape elements. In some examples, the feature set or supported feature richness that can be applied to shapes might vary from the original source (e.g. SVG object) to the native format. Some shape features might not be supported in the SVG format, whereas other features might not be supported in the native format. Advanced shape fill options, rotations, expand, change geometry features, add text features, and special effects such as three-dimensional (3D) effects and glow, are some example of shape features supported by the native format and not the SVG format. Advanced polygon support might be one example of shape features supported by the SVG format and not the native format. Thus, when re-creating SVG source object 410 into the native format, a down-scaling of features might be performed. This downscaling might take the form of a feature set reduction to re-create complex polygons into component lines, freeform splines, or Bézier curves.

Figure 5:
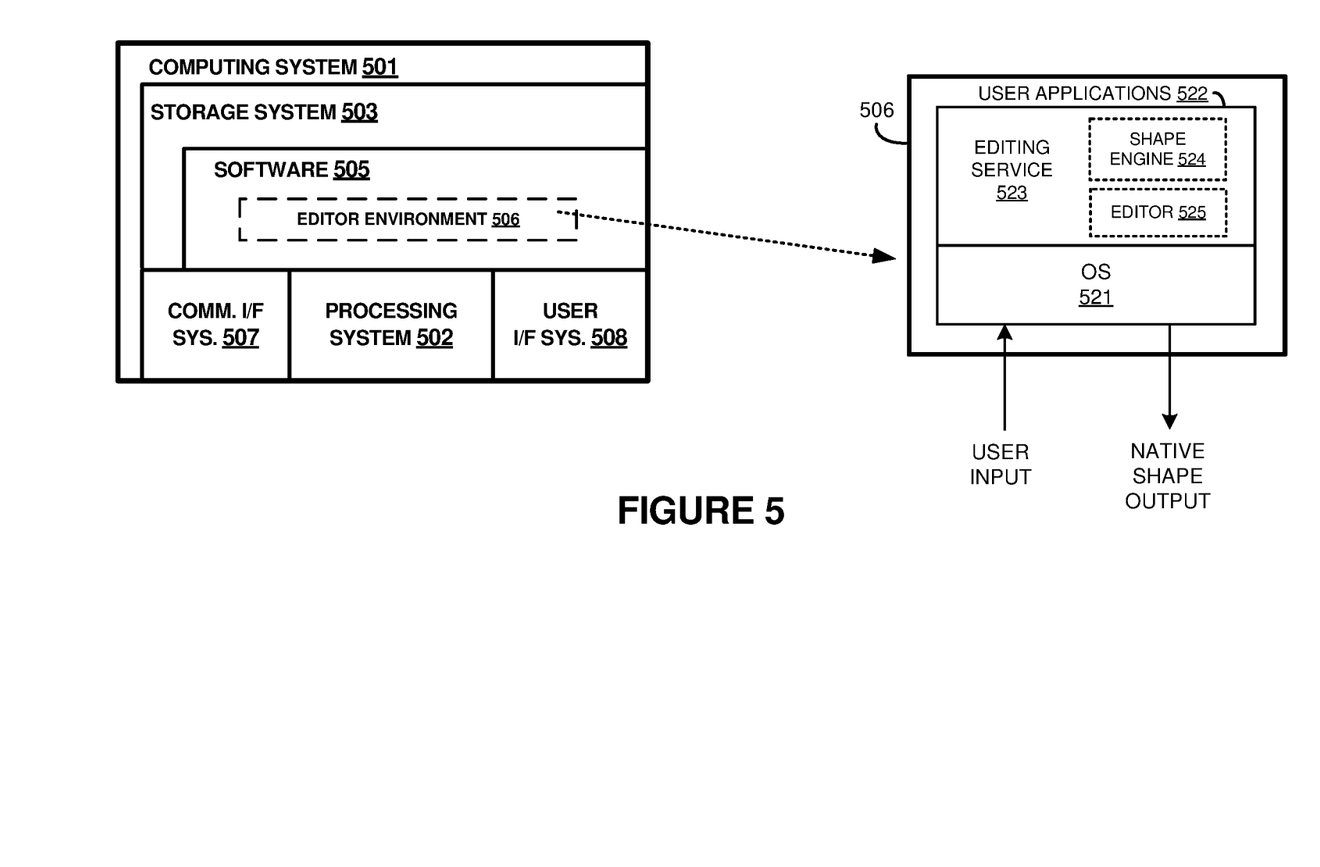
FIG. 5 illustrates a computing system suitable for implementing any of the architectures, processes, and operational scenarios disclosed herein.

FIG. 5 illustrates computing system 501 that is representative of any system or collection of systems in which the various operational architectures, scenarios, and processes disclosed herein may be implemented. Examples of computing system 501 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes editor environment 506, which is representative of the processes discussed with respect to the preceding Figures. When executed by processing system 502 to enhance vector graphics handling for user applications, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing vector graphics handling for user application platforms.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 505 may include additional processes, programs, or components, such as operating system software or other application software, in addition to or that include editor environment 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced vector graphics handling for user applications. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Editor environment 506 includes one or more software elements, such as OS 521, user applications 522, and editing service 523. These elements can describe various portions of computing system 501 with which a user interacts. For example, OS 521 can provide a software platform on which user application is executed and allows for receipt and monitoring of input from user interface system 508 and transfer of user content over communication interfaces. User applications 522 can be any application discussed herein, such as productivity applications, messaging applications, content editors, word processors, spreadsheet applications, drawing applications, or other applications, and includes user interface elements which can be manipulated by a user.

In one example, editing service 523 includes shape engine 524 and editor 525. Shape engine 524 identifies graphical objects in a first vector graphics format and regenerates the graphical objects in a second vector graphics format. Shape engine 524 can parse through a description of various shapes or objects in the first vector graphics format and re-create corresponding shapes or objects in the second vector graphics format, as well as apply properties after the re-creation to the shapes or objects in the second vector graphics format. Editor 525 presents one or more user interface elements for a user to interact with an associated application for creation, manipulation, and storage of various user content comprising vector graphics objects. Editor 525 can present a user interface to import or otherwise identify graphical objects in a first vector graphics format to be regenerated as graphical objects in a second vector graphics format.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 508. In some cases, the input and output devices may be combined in a single device, such as a display capable of displaying images and receiving touch gestures. User interface system 508 can instead provide output and receive input over a network interface, such as communication interface system 507. In network examples, user interface system 508 might packetize display or graphics data for remote display by a display system or computing system coupled over one or more network interfaces.

User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Various improvements to vector graphics handling technology may be appreciated from the foregoing implementations. The ability of a user application to provide user interface options for importing vector graphics into a native format can provide for enhanced operation of content editing applications. The applications can become more efficient in handling of vector graphics and modification of vector graphics, which can reduce processing time and memory usage by reducing the need for a user to save vector graphics in an external or non-native format as well as utilize various features or editing properties not available while the vector graphics are in the non-native format. The technical effects improve the functioning of user content editing applications and associated operating systems, and can reduce storage footprints to maintain non-native vector graphics data.

Certain inventive aspects may be appreciated from the foregoing disclosure, of which the following are various examples.

EXAMPLE 1

A computing apparatus comprising one or more computer readable storage media, a processing system operatively coupled with the one or more computer readable storage media, and program instructions stored on the one or more computer readable storage media comprising an object handling service. Where the object handling service, when executed by the processing system, directs the processing system to at least identify an object in a scalable vector graphics format for import into a user application, parse a description of the object in the scalable vector graphics format to determine shape components that comprise the object, and iterate through each of the shape components to generate at least freeform shape primitives that recreates the object into a native object description of the user application.

EXAMPLE 2

The computing apparatus of Example 1, comprising further program instructions, when executed by the processing system, direct the processing system to at least establish an array comprising the shape components, where the array comprises entries indicating a procedural description of each of the shape components and one or more graphical properties that affect associated ones of the shape components.

EXAMPLE 3

The computing apparatus of Examples 1-2, comprising further program instructions, when executed by the processing system, direct the processing system to at least, after generating the freeform shape primitives, determine which of the one or more graphical properties affect the freeform shape primitives, and apply the one or more graphical properties to at least the freeform shape primitives in the native object description.

EXAMPLE 4

The computing apparatus of Examples 1-3, where the freeform shape primitives comprise at least one of line elements, spline elements, and Bézier curve elements.

EXAMPLE 5

The computing apparatus of Examples 1-4, comprising further program instructions, when executed by the processing system, direct the processing system to at least parse the description of the object in the scalable vector graphics format to determine polygon shape components that comprise at least a portion of the object, and recreate the polygon shape components using at least the freeform shape primitives in the native object description.

EXAMPLE 6

The computing apparatus of Examples 1-5, where to recreate the object into the native object description, the program instructions direct the processing system to at least determine that ones of the shape components can be represented by one or more predetermined polygon shape primitives in the native object description, and responsively recreate the ones of the shape components using the one or more predetermined polygon shape primitives in the native object description.

EXAMPLE 7

The computing apparatus of Examples 1-6, comprising further program instructions, when executed by the processing system, direct the processing system to at least parse the description of the object in the scalable vector graphics format to determine graphical properties applied to the shape components that comprise the object, and after recreating the object into the native object description, apply the graphical properties to the object in the native object description.

EXAMPLE 8

The computing apparatus of Examples 1-7, where the graphical properties comprise at least one of a line weight property, shape fill property, and grouping arrangement among one of the shape components.

EXAMPLE 9

The computing apparatus of Examples 1-8, comprising further program instructions, when executed by the processing system, direct the processing system to at least, after recreating the object into the native object description, apply one or more further graphical properties to the object in the native object description that are not supported by the scalable vector graphics format.

EXAMPLE 10

A method operating an object handling service, the method comprising:
identifying an object in a scalable vector graphics format for import into a user application, parsing a description of the object in the scalable vector graphics format to determine shape components that comprise the object, and iterating through each of the shape components to generate at least freeform shape primitives that recreate the object into a native object description of the user application.

EXAMPLE 11

The method of Example 10, further comprising establishing an array comprising the shape components, where the array comprises entries indicating a procedural description of each of the shape components and one or more graphical properties that affect associated ones of the shape components.

EXAMPLE 12

The method of Examples 10-11, further comprising after generating the freeform shape primitives, determining which of the one or more graphical properties affect the freeform shape primitives, and applying the one or more graphical properties to at least the freeform shape primitives in the native object description.

EXAMPLE 13

The method of Examples 10-12, where the freeform shape primitives comprise at least one of line elements, spline elements, and Bézier curve elements.

EXAMPLE 14

The method of Examples 10-13, further comprising parsing the description of the object in the scalable vector graphics format to determine polygon shape components that comprise at least a portion of the object, and recreating the polygon shape components using at least the freeform shape primitives in the native object description.

EXAMPLE 15

The method of Examples 10-14, where to recreate the one or more graphical objects into the native object description, the method further comprises determining that ones of the shape components can be represented by one or more predetermined polygon shape primitives in the native object description, and responsively recreating the ones of the shape components using the one or more predetermined polygon shape primitives in the native object description.

EXAMPLE 16

The method of Examples 10-15, further comprising parsing the description of the object in the scalable vector graphics format to determine graphical properties applied to the shape components that comprise the object, and after recreating the object into the native object description, applying the graphical properties to the object in the native object description.

EXAMPLE 17

The method of Examples 10-16, where the graphical properties comprise at least one of a line weight property, shape fill property, and grouping arrangement among one of the shape components.

EXAMPLE 18

The method of Examples 10-17, further comprising after recreating the object into the native object description, applying further one or more graphical properties to the object in the native object description that are not supported by the scalable vector graphics format.

EXAMPLE 19

A computing apparatus comprising one or more computer readable storage media, a processing system operatively coupled with the one or more computer readable storage media, and program instructions stored on the one or more computer readable storage media. When executed by the processing system, the program instructions direct the processing system to at least process graphical objects in a scalable vector graphics format to identify a description of the graphical objects in a first vector graphics format that describes shape components that comprise the object and graphical properties applied to the shape components, iterate through each of the shape components to generate at least freeform shape primitives that recreate the graphical objects into a second vector graphics format, and after recreating the graphical objects into the second vector graphics format, applying the graphical properties to the freeform shape primitives.

EXAMPLE 20

The computing apparatus of Example 19, comprising further program instructions, when executed by the processing system, direct the processing system to at least parse the description of the graphical objects in the scalable vector graphics format to determine polygon shape components that comprise at least a portion of the graphical objects, and recreate the polygon shape components using the freeform shape primitives in the second vector graphics format, and determine that ones of the polygon shape components can be represented by one or more predetermined polygon shape primitives in a native object description of the second vector graphics format, and responsively recreating the ones of the polygon shape components using the one or more predetermined polygon shape primitives in the second vector graphics format.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   a processing system operatively coupled with the one or more computer readable storage media; and
   program instructions stored on the one or more computer readable storage media comprising an object handling service, wherein the object handling service, when executed by the processing system, directs the processing system to at least:
   identify an object in a scalable vector graphics format for import into a user application;

parse a description of the object in the scalable vector graphics format to determine shape components that comprise the object, wherein the shape components have shape representations in the scalable vector graphics format; and iterate through each of the shape components to recreate one or more of the shape components using at least freeform line primitives comprising non-predetermined representations different than the shape representations in the scalable vector format to convert the object into a native object description of the user application.

2. The computing apparatus of claim 1, comprising further program instructions, when executed by the processing system, direct the processing system to at least:

establish an array comprising the shape components, wherein the array comprises entries indicating a procedural description of each of the shape components and one or more graphical properties that affect associated ones of the shape components.

3. The computing apparatus of claim 2, comprising further program instructions, when executed by the processing system, direct the processing system to at least:

after generating the freeform line primitives, determine which of the one or more graphical properties affect the freeform line primitives, and apply the one or more graphical properties to at least the freeform line primitives in the native object description.

4. The computing apparatus of claim 2, wherein the freeform line primitives comprise at least one of line elements, spline elements, and Bézier curve elements.

5. The computing apparatus of claim 1, comprising further program instructions, when executed by the processing system, direct the processing system to at least:

parse the description of the object in the scalable vector graphics format to determine polygon shape components that comprise at least a portion of the object, and recreate the polygon shape components using at least the freeform line primitives in the native object description, wherein the polygon shape components comprise polygon shapes not supported by the native object description.

6. The computing apparatus of claim 5, wherein to recreate the object into the native object description, the program instructions direct the processing system to at least determine that at least a portion of ones of the shape components can be represented by one or more predetermined polygon shape primitives in the native object description, and responsively recreate at least the portion of the ones of the shape components using the one or more predetermined polygon shape primitives in the native object description.

7. The computing apparatus of claim 1, comprising further program instructions, when executed by the processing system, direct the processing system to at least:

parse the description of the object in the scalable vector graphics format to determine graphical properties applied to the shape components that comprise the object; and after recreating the object into the native object description, apply the graphical properties to the object in the native object description.

8. The computing apparatus of claim 7, wherein the graphical properties comprise at least one of a line weight property, shape fill property, and grouping arrangement among one of the shape components.

9. The computing apparatus of claim 1, comprising further program instructions, when executed by the processing system, direct the processing system to at least:

after recreating the object into the native object description, apply one or more further graphical properties to the object in the native object description that are not supported by the scalable vector graphics format.

10. A method of operating an object handling service, the method comprising:

importing into a user application a user data file comprising an object in a scalable vector graphics format;

parsing a description of the object in the scalable vector graphics format to determine shape components that comprise the object, wherein the shape components have shape representations in the scalable vector graphics format; and iterating through each of the shape components to recreate one or more of the shape components using at least freeform line primitives comprising non-predetermined representations different than the shape representations in the scalable vector format to convert the object into a native object description of the user application.

11. The method of claim 10, further comprising:

establishing an array comprising the shape components, wherein the array comprises entries indicating a procedural description of each of the shape components and one or more graphical properties that affect associated ones of the shape components.

12. The method of claim 11, further comprising:

after generating the freeform line primitives, determining which of the one or more graphical properties affect the freeform line primitives, and applying the one or more graphical properties to at least the freeform line primitives in the native object description.

13. The method of claim 11, wherein the freeform line primitives comprise at least one of line elements, spline elements, and Bézier curve elements.

14. The method of claim 10, further comprising:

parsing the description of the object in the scalable vector graphics format to determine polygon shape components that comprise at least a portion of the object, and recreating the polygon shape components using at least the freeform line primitives in the native object description, wherein the polygon shape components comprise polygon shapes not supported by the native object description.

15. The method of claim 14, wherein to recreate the one or more graphical objects into the native object description, the method further comprises:

determining that at least a portion of ones of the shape components can be represented by one or more predetermined polygon shape primitives in the native object description, and responsively recreating at least the portion of the ones of the shape components using the one or more predetermined polygon shape primitives in the native object description.

16. The method of claim 10, further comprising:

parsing the description of the object in the scalable vector graphics format to determine graphical properties applied to the shape components that comprise the object; and after recreating the object into the native object description, applying the graphical properties to the object in the native object description.

17. The method of claim 16, wherein the graphical properties comprise at least one of a line weight property, shape fill property, and grouping arrangement among one of the shape components.

18. The method of claim 16, further comprising:
after recreating the object into the native object description, applying further one or more graphical properties to the object in the native object description that are not supported by the scalable vector graphics format.

19. A computing apparatus comprising:
one or more computer readable storage media;
a processing system operatively coupled with the one or more computer readable storage media; and
program instructions stored on the one or more computer readable storage media, that when executed by the processing system, direct the processing system to at least:
process graphical objects in a first vector graphics format to identify a description of the graphical objects in the first vector graphics format that describes shape components that comprise the object and graphical properties applied to the shape components wherein the shape components have shape representations in the first vector graphics format;
iterate through each of the shape components to recreate one or more of the shape components using at least freeform line primitives comprising non-predetermined representations different than the shape representations in the first vector format to convert the graphical objects into a second vector graphics format; and
after recreating the graphical objects into the second vector graphics format, applying the graphical properties to the freeform line primitives.

20. The computing apparatus of claim 19, comprising further program instructions, when executed by the processing system, direct the processing system to at least:
parse the description of the graphical objects in the first vector graphics format to determine polygon shape components that comprise the graphical objects
determine that a first portion of the polygon shape components comprise polygon shapes not supported in a native object description of the second vector graphics format, and responsively recreate the first portion of the polygon shape components using the freeform line primitives in the second vector graphics format; and
determine that a second portion of the polygon shape components can be represented by one or more predetermined polygon shape primitives supported by the native object description of the second vector graphics format, and responsively recreate at least the second portion of the polygon shape components using the one or more predetermined polygon shape primitives in the second vector graphics format.

* * * * *